United States Patent [19]

Smith

[11] Patent Number: 5,229,913
[45] Date of Patent: Jul. 20, 1993

[54] CONTROLS FOR VIBRATORY MACHINES

[76] Inventor: Roger G. Smith, 17693 SW. Blue Heron Rd., Lake Oswego, Oreg. 97034

[21] Appl. No.: 787,248

[22] Filed: Nov. 4, 1991

[51] Int. Cl.⁵ ............................................. H02B 1/26
[52] U.S. Cl. .................................... 361/334; 361/346
[58] Field of Search ................. 318/17, 128, 460; 5/118; 361/331, 334, 346, 380

[56] References Cited

U.S. PATENT DOCUMENTS

| | | | |
|---|---|---|---|
| Re. 33,835 | 3/1992 | Kime et al. ............................ | 239/657 |
| 3,597,554 | 8/1971 | Siegal ................................ | 318/466 X |
| 3,628,115 | 12/1971 | Pruitt ................................ | 318/631 X |
| 3,664,431 | 5/1972 | Tatianko et al. . | |
| 3,756,341 | 9/1973 | Tonkowich et al. . | |
| 3,781,927 | 1/1974 | Zakaras ............................... | 307/92 X |
| 4,177,498 | 12/1979 | Weitz ................................ | 361/360 |
| 4,182,569 | 1/1980 | Smith . | |
| 4,325,061 | 4/1982 | Wolar ............................. | 200/61.43 X |
| 4,523,250 | 6/1985 | Bacchiere et al. ................... | 361/145 |
| 4,613,801 | 9/1986 | Tatom, Jr. ........................... | 318/440 |
| 4,697,979 | 10/1987 | Nakashima et al. ................. | 414/786 |
| 4,788,413 | 11/1988 | Eng . | |
| 4,932,831 | 6/1990 | White et al. ....................... | 414/732 |
| 4,973,206 | 11/1990 | Engle ................................ | 410/67 |
| 5,007,793 | 4/1991 | Irvin ................................. | 414/502 |
| 5,013,240 | 5/1991 | Bailey et al. ........................ | 433/77 |
| 5,077,844 | 1/1992 | Twitchell et al. ..................... | 5/87 |
| 5,092,422 | 3/1992 | Hood, Jr. et al. .................... | 180/329 |
| 5,121,796 | 6/1992 | Wigington, Sr. ..................... | 166/379 |

*Primary Examiner*—Bentsu Ro
*Attorney, Agent, or Firm*—Kolisch Hartwell Dickinson McCormack & Heuser

[57] ABSTRACT

Disclosed is a vehicle adapted for movement over the road supporting heavy-duty road construction equipment. A control panel housing instrumentation controlling motors in the equipment is detachably supported on a vehicle frame in the vehicle through a pivoted frame that mounts the control panel, and a platform frame which supports the pivoted frame. During road transport, the pivoted frame assumes a position on the vehicle with the control panel in a prone position. With the equipment readied for use, the control panel, and the pivoted and platform frames, are separated from the vehicle, and the platform frame rested on the ground. The pivoted frame may then be pivoted to swing the control panel to an upright position.

12 Claims, 3 Drawing Sheets

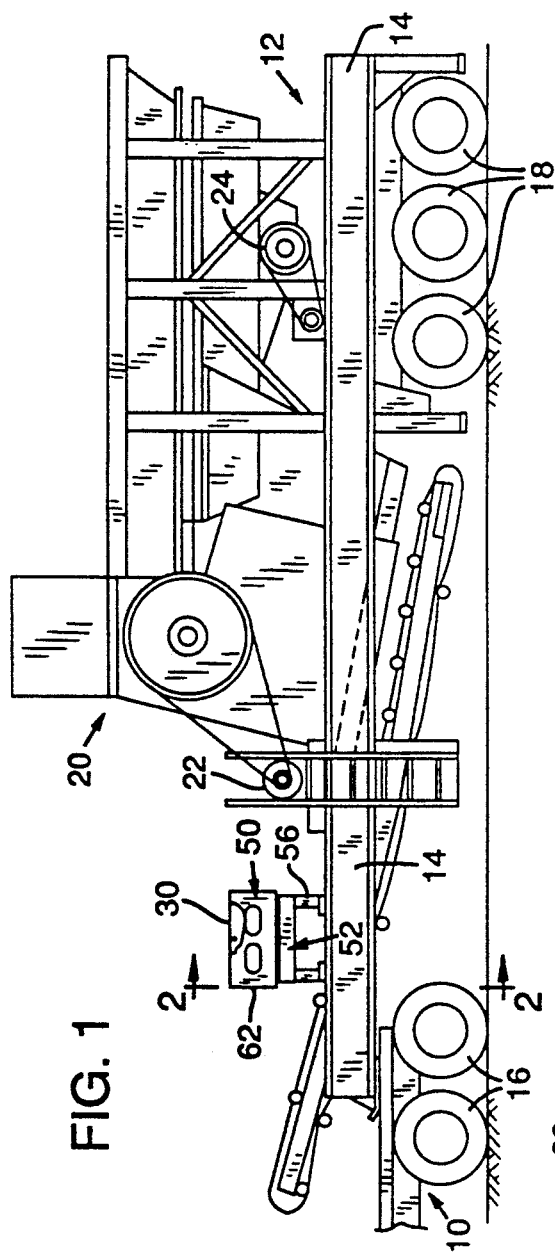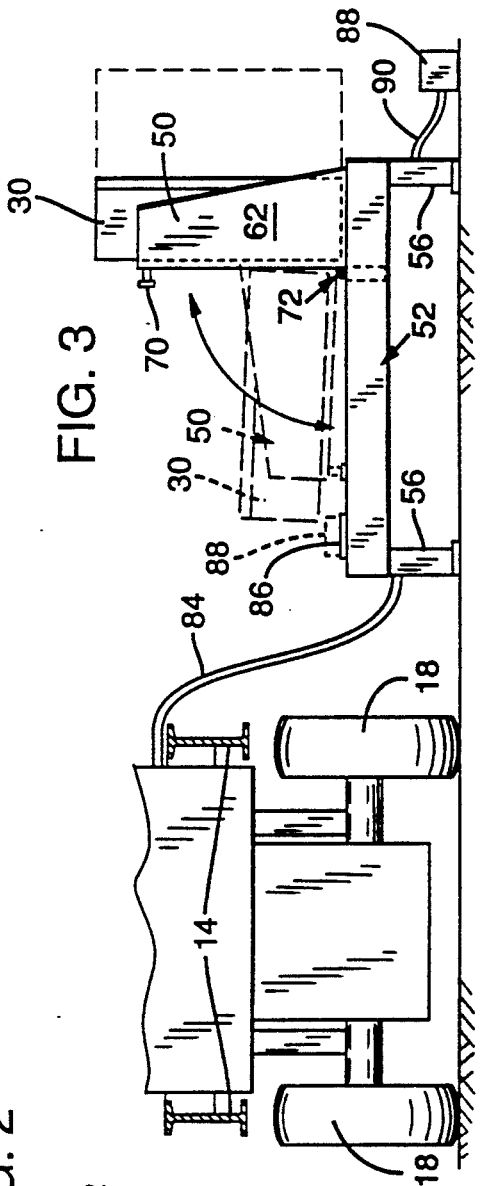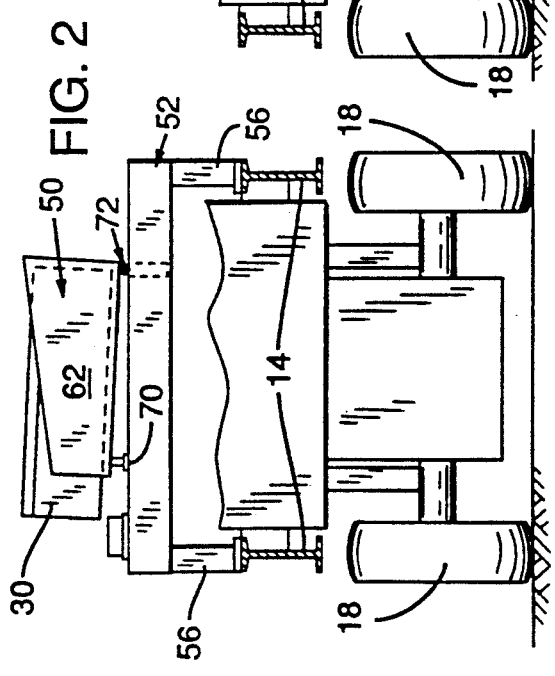

CONTROLS FOR VIBRATORY MACHINES

BACKGROUND AND SUMMARY OF THE INVENTION

This invention relates to mobile power-driven equipment and, more particularly, to a control system for controlling operation of the numerous motors that typically form part of the equipment.

By way of example, in the construction industry, it is frequently necessary to provide crushing and screening apparatus adjacent a supply of rock material located in the vicinity of the construction site, for the purpose of crushing rock mined from the supply to produce crushed rock and gravel of the size required to carry out the construction job. In a crusher and screener, it is not unusual to find ten or more electric and/or hydraulic motors, or other power-operated devices, that are controlled for the purpose of carrying out the various functions performed by the crusher. In some instances, such as in the case of the motor running the actual crusher, a considerable current load is controlled. The motor control relays, circuit breakers, switches, starters, and other components, such as those needed in so-called soft-start systems for larger motors, are conventionally housed within a control panel accessible by opening up a side of the control panel by an operator using the equipment.

A serious problem that has been experienced in connection with the control of mobile equipment of the type briefly described is a tendency over time for the control devices just enumerated to break apart from their mounting in the control panel and otherwise malfunction. It has been observed that this problem primarily is the result of the continuous jarring and vibration which occurs on operating the various mechanisms associated with the crusher. A certain amount of jarring and vibration occurs by reason of vehicle travel, but in apparatus such as a rock crusher, when the vehicle is at rest, continued jarring and shaking of vehicle components occurs through operation of the rock crusher and other systems in the crusher.

A general object of this invention is to provide, in power-operated equipment, an improved control system for the power-operated instrumentalities in the equipment, better enabling control devices in the control system to withstand the vibration and jarring associated with operation of the equipment.

More specifically, an object of the invention is to provide a control panel which houses the control devices for operating various motor-operated instrumentalities in a road transportable system, which is placed in different positions during different operating phases for the vehicle. With the vehicle readied for road transport, the control panel occupies a substantially horizontal position firmly secured on the vehicle, with control devices and their mountings within the panel thus best enabled to withstand the up and down vibrations which occur as a result of vehicle movement. With the vehicle at the job site and stopped, and to ready the panel for easy access, the panel is shifted from a horizontal to a vertical position. Additionally, the control panel is removed from the vehicle and stationed at a location to one side of the vehicle where the control panel is isolated from the shocks and jars produced when operating the instrumentalities on the vehicle.

In a specific and preferred embodiment of the invention, the control devices within the panel, such as switches, relays, starters, etc. are operatively connected to the motor devices they control by flexible conductor means having sufficient extent to enable the control panel to be shifted from the vehicle to a location on one side of the vehicle. Further, the panel is supported through a pivotal mounting on what is referred to as a platform frame, with the platform frame being usable either to support the panel in suitable fashion on the vehicle, or when the panel is removed from the vehicle, to support the panel in suitable fashion to one side of the vehicle. The pivotal mounting described enables the panel to be swung between upright and horizontal positions, with the panel upright when providing easy access for an operator, and horizontal when positioned for vehicle transport.

BRIEF DESCRIPTION OF THE DRAWINGS

These and various other objects and advantages are attained by the invention, which is described hereinbelow in conjunction with the accompanying drawings, wherein:

FIG. 1 is a side elevation, in somewhat simplified form, of a trailer adapted for highway transport supporting a crusher, and showing a control system as contemplated herein;

FIG. 2 is a simplified sectional view, taken generally along the line 2—2 in FIG. 1, and on a slightly enlarged scale, showing how a control panel is supported;

FIG. 3 is a view similar to FIG. 2, but showing the control panel and its support removed from the frame of the trailer and supported on the ground adjacent the trailer;

FIG. 7 (drawing page 1) is similar to portions of FIG. 1, but showing a modified form of the invention.

DETAILED DESCRIPTION OF A PREFERRED EMBODIMENT

Figure 4:
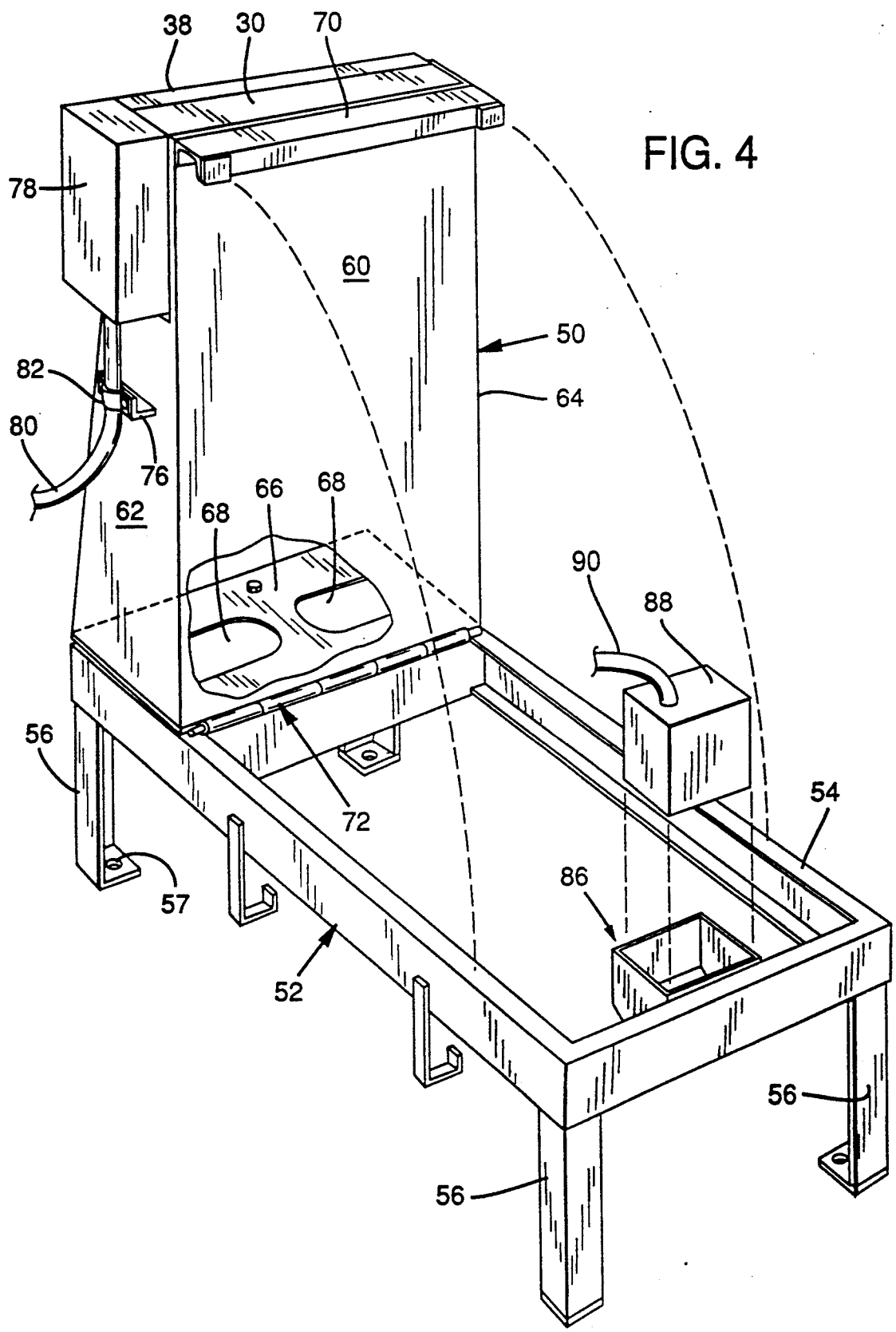
FIG. 4 is an enlarged perspective view illustrating a cradle frame and platform frame such as might me employed in the support of a control panel according to the invention.

Referring now to the drawings, and initially more particularly to FIG. 1, illustrated generally at 10 is the rear portion of truck tractor, of the type adapted for movement over the highways. Secured through the usual fifth wheel connection to this tractor is a trailer, indicated generally at 12. Such includes a trailer frame 14. The trailer and tractor move over the ground on wheels 16 shown for the tractor, and wheels 18 shown for the trailer.

Supported on the trailer frame, and shown in simplified form, is a rock crusher 20. A rock crusher exemplifies typical apparatus used by a contractor to provide the crushed rock and gravel to be used in making the road bed and pavement of a highway or of the road. As typifies such equipment, the rock crusher may include a number of motors such as the electric and hydraulic motors utilized in powering instrumentalities on the crusher such as the crusher itself, conveyors, screens, etc. In larger units, certain of these devices may draw a considerable current load when operating. In the crusher depicted, typical motors are shown at 22 and 24.

Motor control relays, circuit breakers, switches, starters, soft-start systems for larger motors, etc. are typically found in the control systems provided for the various motors. These control devices typically are housed within what is referred to as a control panel. A control panel in the drawings is indicated generally at 30.

Figure 6:
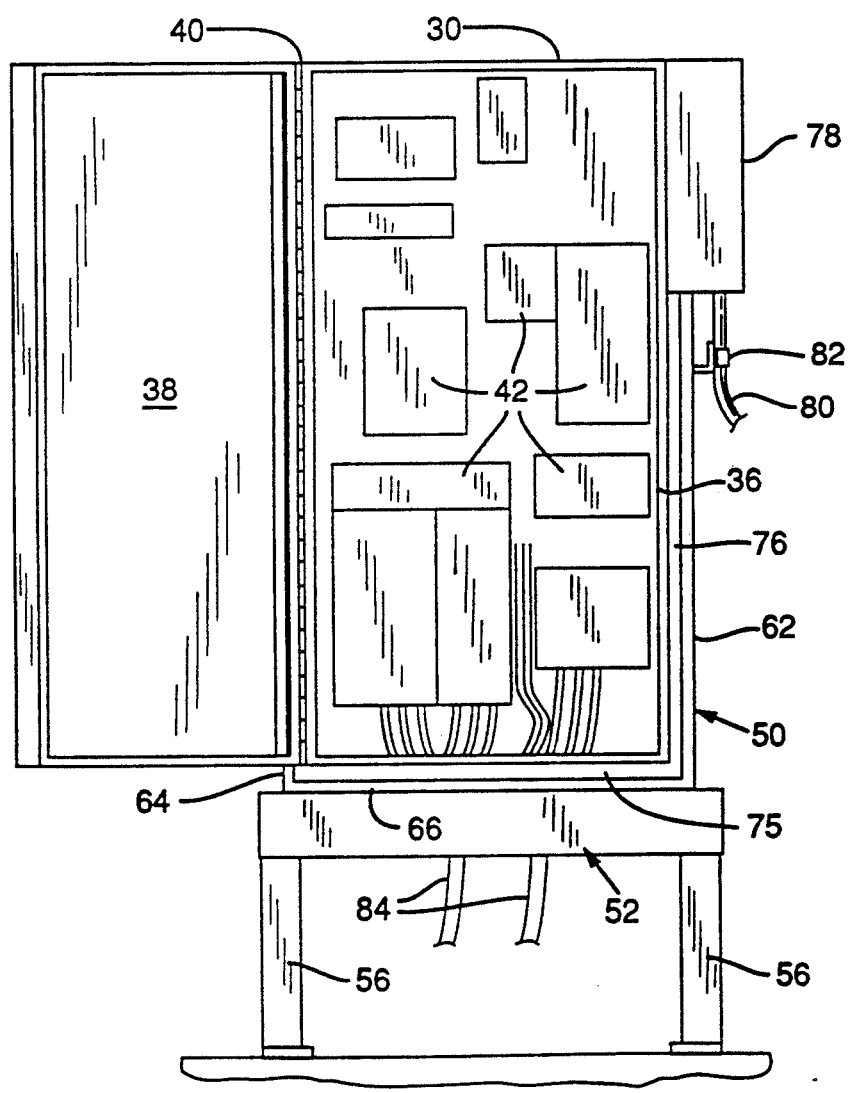
FIG. 6 is a front view of the control panel with its access door open.

The control panel (refer to FIG. 6) includes a panel housing 36, which in the embodiment of the invention illustrated is a substantially rectangular structure having greater width than thickness. When the control panel is set up for use of its interior components, the panel is mounted in an upright position. A side of the panel is formed by a swingable door 38 which, with the panel upright, is swingable about a vertical axis 40 to open up the panel and provide access to the panel's interior.

Housed within the panel are the usual control devices 42 necessary for the control of motors in the crusher. Such devices include starter relays, circuit breakers, switches, etc. With the panel upright and the door swung open, all these devices are exposed for observation and manipulation by the operator of the crusher. The control devices within the panel have been illustrated simplistically and in outline in FIG. 6. Typically, the enumerated control devices are mounted in place with bolts or screws subjected to destructive sheer stress with the panel upright and as the result of up-and-down vibration. With the panel horizontal, up-and-down vibrations produce compressive stresses in the fasteners, these being better withstood by the fasteners than the shearing stresses.

The control panel is supported in the equipment employing what is referred to herein as a cradle frame shown at 50, and a platform frame, indicated generally at 52.

Considering details of these structures (see FIG. 4), and first of all the platform frame, such includes a table expanse 54 forming the top of the platform frame. Such may have a generally rectangular outline as pictured. Supporting the table expanse at an elevated position are legs, such as those shown at 56.

In FIGS. 1 and 2, frame 52 is shown positioned on the trailer with its legs 56 bearing on and supported by trailer frame 14. In this position, the platform frame extends generally transversely of the trailer frame, and may have a position straddling any equipment mounted on the trailer frame. In FIG. 3, the platform frame is shown as it is positioned when removed from the trailer frame and resting on the ground, with legs 56 now supported by the ground. In securing the platform frame to the trailer frame, apertures 57 (see FIG. 4) in pads at the base of legs 56 receive fasteners securing the pads to the trailer frame.

Cradle frame 50 includes an elongate panel 60, sides 62, 64, and end section 66. All these may be secured together as by welding. The end section 66 may conveniently include cutouts 68 providing for the passage therethrough of the cables and other conductors normally extending into the control panel. Secured along an end margin of panel 60 is a rib piece 70.

The cradle frame is mounted on the platform frame and connected to the platform frame through a hinge 72. The hinge accommodates swinging of the cradle frame from the prone position illustrated in FIGS. 1 and 2, to the upright position illustrated in FIG. 4. In the prone position, rib piece 70 has ends contacting the platform frame. In the upright position, end section 66 contacts the platform frame.

Figure 5:
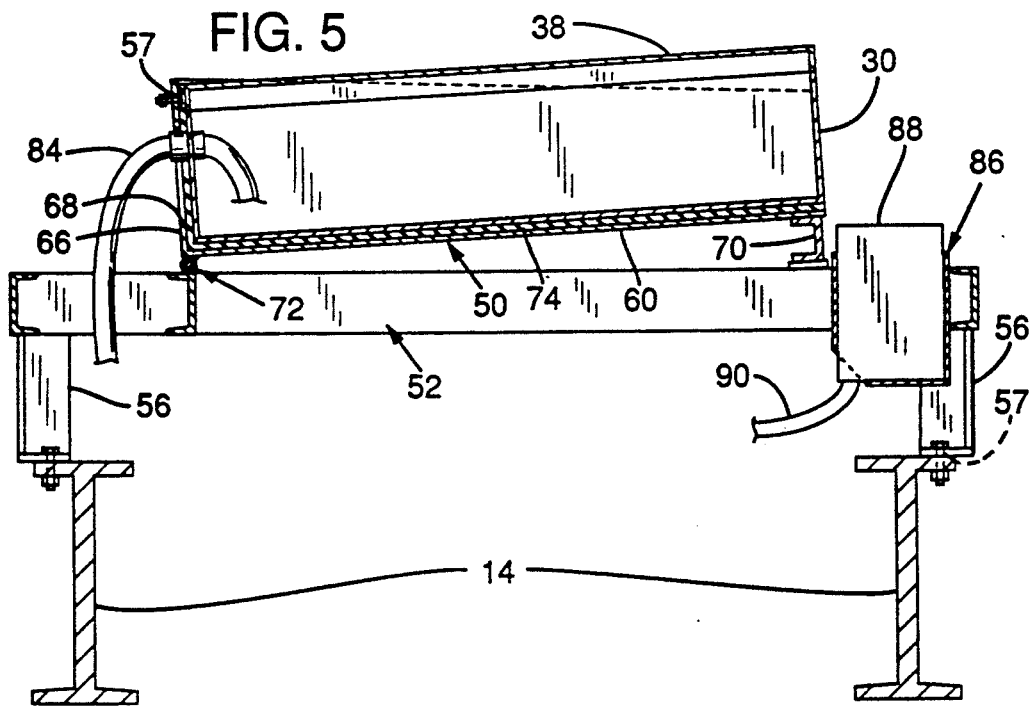
FIG. 5 is a side elevation, partly in section, of the control panel, and showing how such is supported within the cradle frame and on the platform frame.

Control panel 30 is mounted within the cradle frame in a suitable manner. A rubber cushion or layer 74 (see FIG. 5) may be provided between panel 60 of the cradle frame and the back of the control panel housing which lies thereover. Additionally, a cushion layer 75 may be provided between end section 66 and the panel housing, and an additional cushion layer 76 provided between the panel housing and sides 62, 64 of the cradle frame.

Shown at 76 (see FIG. 4) is a bracket, and shown at 78 is a box housing. A portion of the usual flexible electrical supply cable is shown at 80 which provides the power for energizing the various electric motors in the apparatus. Cable 80 may have a considerable size, and a four inch diameter is not uncommon. The bracket is employed to receive an angle bracket 82 which clamps against and holds the power cable in place. From this bracket the power cable extends into box housing 78 and thence to an operative connection inside the control panel. The power cable extends from the portion that is illustrated in an elongate reach which is connected at its end to a power supply, such as a generator, or a transformer connected to power company power lines.

Portions of additional conductors or cables are shown at 84. These have one set of extremities extending into the control panel for an operative connection with the control devices provided within the control panel. Opposite extremities are connected in most instances to the powered devices which they control distributed on the vehicle.

A retainer box is illustrated at 86 and this is an open-top box structure secured to the platform frame. The box is adapted to receive a portable control unit, shown at 88. Push buttons on this control unit may be electrically connected to relays or other switches in the control panel to provide panic button shutdown capability. The control unit is connected to the control panel via a flexible conductor 90 which extends from the unit and thence upwardly into the control panel through the base of the panel housing.

The conductors which connect the control panel with the motors and other devices controlled in the crusher are flexible, and have sufficient length to enable movement of the platform frame together with the control panel which is supported thereon, from the position of the platform frame resting on the trailer frame, as shown in FIGS. 1 and 2, and the position shown resting on the ground, as shown in FIG. 3.

With the equipment readied for road transport, the cradle frame together with the control panel therein is swung to the horizontal prone position, whereby the back or large side of the control panel overlies the platform frame. The platform frame in turn is mounted in a secured position on the trailer frame of the trailer. The cradle frame's free end is secured to the platform frame. To ready the control panel for access for controlling the various motors during use of the crusher, the table frame and the cradle frame supported thereon are moved to a ground-supported position, and the cradle frame swung to an upright position, which places the control panel in an upright position. With the control panel in its upright position, panel door 38 may be swung open to provide access to the interior of the control panel by any operator of the equipment.

The cushioning that has been described, as exemplified by cushion layer 74, serves to isolate vibrations and jars in the vehicle frame from the components housed within the control panel with road transport of the equipment. With the control panel horizontal, fasteners such as screws and bolts securing control devices to the back of the panel housing are subjected to a compression stress with vibratory movement. These fasteners are better enabled to withstand jars and vibrations imparted in a compression-transmitting way. As a consequence, maintenance problems are substantially reduced by this mode of carrying the control panel over the road. With the equipment set up for use, such as, for example, the crushing of rock, the control panel and what it contains are removed from the trailer frame and, thus, effectively isolated from the jars and vibrations imparted to the frame by operation of the crusher. The control panel may be positioned in an upright position without vibration produced stresses imparted to the fasteners holding control devices in place.

In FIG. 7, there is illustrated a modified form of the invention. As shown in this figure, the control system for the apparatus includes a pair of control panels, i.e. the one shown at 30, and, in addition, the one shown at 100. In certain installations, such as one which includes a soft-start system for a heavy-duty electrical motor, additional circuitry might be required above that which may be incorporated in one control panel. It is convenient in such circumstances to provide two control panels, with one mounted over the other, as shown in FIG. 7. Control panel 100, like control panel 30, has a cradle frame receiving it (frame 102), and a platform frame mounting the cradle frame on the vehicle platform frame 104.

While modifications have been described, obviously further modifications and variations are possible without departing from the invention.

What is claimed and desired to secure by letters patent:

1. In a vehicle having a vehicle frame and transport means mounting the frame for movement over the ground, the improvement comprising:
   motor-driven equipment mounted on the vehicle frame including a drive motor therefore,
   controls for said motor including a control panel and motor control means housed within the panel for controlling motor operation,
   elongate flexible conductor means connecting the motor control means in the panel and said motor, and
   disconnectable means mounting the control panel on the vehicle frame and disconnectable to permit the control panel to be removed from the vehicle frame and placed at a location on one side of the vehicle, said flexible conductor means having a length sufficient to enable such removal and placement,
   said control panel having an operating position and a transport position and the control panel having an access side which is upright with the panel in its operating position, said access side being inclined from upright with the control panel in its transport position, the disconnectable means mounting the control panel on the vehicle frame with the control panel in said transport position.

2. The vehicle of claim 1, which further includes means for supporting the control panel in said operating position with the control panel removed from the vehicle frame and placed at a location on one side of the vehicle.

3. The vehicle of claim 1, wherein the disconnectable means mounting the control panel on the vehicle frame comprises a platform frame, detachable means securing the platform frame to the vehicle frame, and means including pivot means pivotally mounting the control panel on the platform frame.

4. The vehicle of claim 3, wherein said pivot means pivotally mounts the control panel on the platform frame for pivotal movement of the panel between a position wherein the access side is upright and a position wherein the access side is substantially horizontal.

5. The vehicle of claim 1, wherein the disconnectable means mounting the control panel on the vehicle frame includes a cradle frame which cradles the panel, a platform frame which supports the cradle frame on the vehicle frame, means detachably securing the platform frame to the vehicle frame, and means pivotally mounting the cradle frame on the platform frame.

6. A controller in combination with a plurality of motors, comprising:
   a control panel for the motors,
   motor control devices mounted within the control panel for controlling operation of the motors,
   flexible conductor means extending from the control panel and connecting the motor control devices with respective motors,
   a flexible power-supply conductor extending into the control panel for the supply power to the motors,
   a cradle frame supporting the control panel,
   a platform frame, and
   means pivotally mounting the cradle frame on the platform frame.

7. The controller of claim 6 further including a vehicle frame and means supporting the vehicle frame for movement over the ground, detachable means detachably mounting the platform frame in a position supported on the vehicle frame, the detachable means on detachment accommodating removal of the platform frame to relocate the platform frame on one side of the vehicle frame.

8. The controller of claim 7, and which further comprises a portable control unit having control switches therein, and a second flexible conductor means connecting said control switches of said control unit with said control devices within said panel.

9. The controller of claim 6, which further includes cushion means interposed between the control panel and the cradle frame for cushioning the control panel from vibrations occurring in the cradle frame.

10. The controller of claim 9, wherein the control panel has an access side and said access side is upright with the control panel positioned for operator access for motor control, and wherein said pivot means mounts the cradle frame for movement between a position wherein the control panel has its access side upright and a position wherein the control panel has its access side substantially horizontal.

11. In a vehicle having a vehicle frame and transport means mounting the frame for movement over the ground, the improvement comprising:
   motor-driven equipment mounted on the vehicle frame including an electrically powered drive motor for the equipment,
   an electrical switch device which is opened and closed to control the supply of electrical power to said electrically powered drive motor,
   an elongate flexible conductor connecting said switch device and said electrically powered drive motor for conducting electrical power from the switch device to the drive motor and an elongate flexible power cable connecting said switch device with an electrical power supply for delivering electrical power to the switch device, a control panel housing the switch device and having the switch device mounted therein, and a disconnectable mounting mounting the control panel on the vehicle frame and disconnectable to permit the control panel to be removed from the vehicle frame and placed at a location on one side of the vehicle, said flexible conductor and said flexible power cable enabling such removal and placement.

12. The vehicle of claim 11 wherein said disconnectable mounting includes a frame which is detachably mounted on the vehicle frame and a mounting of the control panel on the detachable frame accommodating shifting of the position of the control panel relative to the detachable frame.

* * * * *